G. T. STOTT & T. J. HEAFEY.
INNER TUBE FOR TIRES.
APPLICATION FILED DEC. 27, 1916.

1,245,524.

Patented Nov. 6, 1917.

Witnesses

Inventor
G. T. Stott
T. J. Heafey
By
Attorneys

UNITED STATES PATENT OFFICE.

GROVER T. STOTT AND THOMAS J. HEAFEY, OF SPRINGFIELD, OHIO; SAID STOTT ASSIGNOR TO SAID HEAFEY.

INNER TUBE FOR TIRES.

1,245,524.   Specification of Letters Patent.   Patented Nov. 6, 1917.

Application filed December 27, 1916. Serial No. 139,138.

*To all whom it may concern:*

Be it known that we, GROVER T. STOTT and THOMAS J. HEAFEY, citizens of the United States, residing at Springfield, in the county of Clark, State of Ohio, have invented certain new and useful Improvements in Inner Tubes for Tires; and I do hereby declare the following to be a full, clear, and exact description of the invention, such as will enable others skilled in the art to which it appertains to make and use the same.

This invention is an improvement in pneumatic tires and has particular reference to an inner tube therefor.

An object of the invention is to facilitate the repair of a blow out in the outer casing of a tire and relieve the pressure on the fractured part of said casing, and to this end, the inner tube is provided with a tubular reinforcing member or filler of less flexibility than the remainder of the tube, which member is adapted to be moved around in the tire casing until the same covers the blow out therein.

Another object is the provision of an inner tube of this character which is simple in structure, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1:
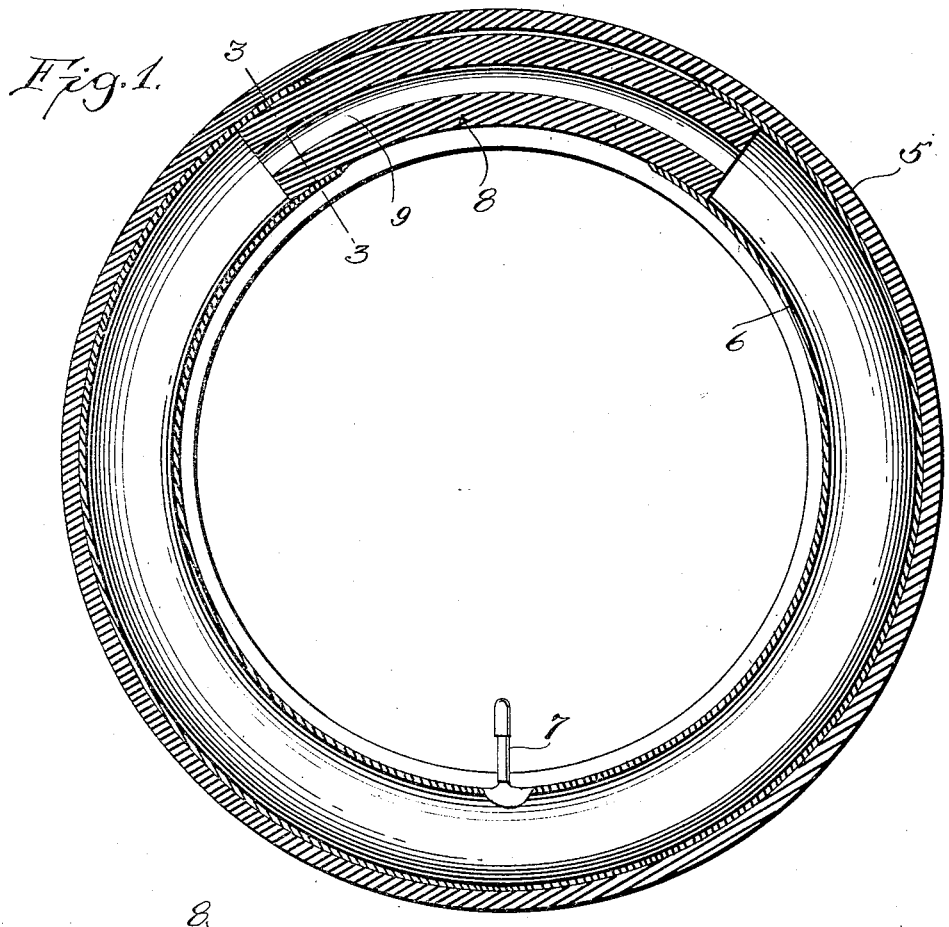
Figure 1 is a longitudinal section taken through a tire casing showing the improved inner tube therein.
Figure 2:
Fig. 2 is a fragmentary side elevation of the inner tube.
Figure 3:
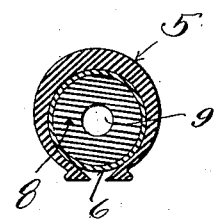
Fig. 3 is a section on the line 3—3 of Fig. 1.
Figure 4:
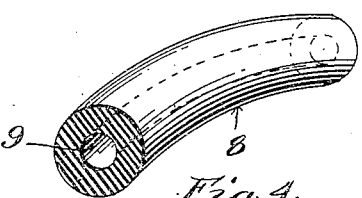
Fig. 4 is a perspective view of the reinforcing member or filler of the inner tube detached.

Referring more particularly to the accompanying drawing in which like reference characters indicate similar parts the numeral 5 indicates the ordinary outer casing of a pneumatic tire.

The present invention is designed for the purpose of avoiding the necessity of the automobilist carrying additional outer casings for use in the event of blow outs and said invention consists, in its preferred form, of an inner tube 6 the major portion of which is of ordinary construction and has the usual valve 7 for the purpose of inflating the same. This major portion is made of the usual relatively thin rubber tubing, the ends of which are connected by the tubular reinforcing member or filler 8 which is preferably made of rubber or a suitable fabric which is of less flexibility than the remainder of the tube. In the manufacture of the tube the ends of the body or major portion thereof are slipped over the ends of the member 8 and said ends are secured together by vulcanizing so that said body portion and reinforcing member will form a continuous tube. The tubular reinforcing member 8 is preferably provided with a relatively small longitudinal opening 9 for permitting the passage of air therethrough when the tire is being inflated and it will be seen that by making this opening of small diameter the wall of the member 8 will be relatively thick which fact renders said member less flexible than the remaining portion of the tube.

It will thus be seen that said member 8 will reinforce the tire at the point of the blow out and will also relieve the pressure on the casing at this particular point.

What is claimed is:—

1. An inner tube for pneumatic tires comprising a body portion, and a reinforcing member of less flexibility than said body portion, said inner tube being adapted to be shifted in the outer casing of said tire whereby said reinforcing member will cover a blow out in said casing.

2. An inner tube for pneumatic tires comprising a body portion, and a tubular reinforcing member of less flexibility than said body portion, said member being adapted to fill the space in the outer casing of the tire adjacent a blow out therein.

3. An inner tube for pneumatic tires comprising a body which forms the major portion of said tube and which is made of relatively thin material, and a reinforcing member of greater thickness than the body of the tube and forming a continuation thereof.

4. An inner tube for pneumatic tires comprising a tubular body portion formed of relatively thin material, and a reinforcing member of the same diameter as the said body portion and forming a continuation thereof, said reinforcing member having a relatively small longitudinal opening therein.

5. An inner tube for pneumatic tires comprising a tubular body portion and a tubular reinforcing member, the wall of which is of a greater thickness than the wall of said body portion.

6. An inner tube for pneumatic tires comprising a tubular body portion and a tubular reinforcing member secured to the ends of said body portion and forming a continuation thereof, said reinforcing member being of less flexibility than the body portion and having its wall of greater thickness than said body portion.

In testimony whereof we affix our signatures in the presence of two witnesses.

GROVER T. STOTT.
THOMAS J. HEAFEY.

Witnesses:
BARTON L. MINTURN,
H. H. STARR.

Copies of this patent may be obtained for five cents each, by addressing the "Commissioner of Patents, Washington, D. C."